United States Patent
Fleming et al.

(10) Patent No.: US 8,348,587 B2
(45) Date of Patent: Jan. 8, 2013

(54) VEHICLE STORAGE/LOADING SYSTEM FOR SHEETS

(75) Inventors: Steve David Fleming, Hockley (GB); John K. Harding, Leigh-on-Sea (GB); Jonathan M. Fisher, Brentwood (GB); Alicia Agius, Romford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 12/897,275

(22) Filed: Oct. 4, 2010

(65) Prior Publication Data

US 2011/0103926 A1    May 5, 2011

(30) Foreign Application Priority Data

Oct. 29, 2009   (GB) .................................. 0918965.5

(51) Int. Cl.
*B60P 1/64* (2006.01)
(52) U.S. Cl. ........ 414/537; 414/448; 414/527; 414/539; 414/787; 414/812; 410/87; 410/137; 410/156; 224/563
(58) Field of Classification Search .................. 414/448, 414/449, 469, 527, 537, 539, 787, 812; 410/87, 410/137, 156; 224/563
See application file for complete search history.

(56) References Cited

U.S. PATENT DOCUMENTS

| | | | |
|---|---|---|---|
| 1,999,056 A | 4/1935 | Patton | |
| 2,094,401 A | 9/1937 | Girl | |
| 2,398,730 A | 4/1946 | Terry | |
| 2,573,584 A * | 10/1951 | Le Tourneau | 414/539 |
| 3,549,030 A | 12/1970 | Coughran, Jr. et al. | |
| 3,627,158 A | 12/1971 | Kobasic | |
| 3,685,799 A | 8/1972 | Wriedt | |
| 3,870,178 A | 3/1975 | Ellen | |
| 3,998,167 A | 12/1976 | Van Gompel | |
| 4,063,659 A * | 12/1977 | Welch | 414/462 |
| 4,360,298 A | 11/1982 | Fischer et al. | |
| 4,385,856 A | 5/1983 | O'Neal | |
| 4,700,421 A | 10/1987 | Gladney et al. | |
| 4,955,771 A | 9/1990 | Bott | |
| 4,984,837 A | 1/1991 | Dise | |
| 5,197,642 A | 3/1993 | Cortelli | |

(Continued)

FOREIGN PATENT DOCUMENTS

DE   202007007439 U1   10/2007

OTHER PUBLICATIONS

Search Report Under Section 17(5) from GB0918965.5 dated Feb. 11, 2010, 4 pages.

*Primary Examiner* — Scott Lowe
(74) *Attorney, Agent, or Firm* — Raymond Coppiellie; Price Heneveld LLP

(57) ABSTRACT

A motor vehicle having an assembly for loading sheet material includes a cargo area having a loading opening and a bulkhead located at an opposite end of the cargo area from the loading opening. Also included is a passenger compartment located at a forward region of the vehicle. Further included is at least one fixed end stop located proximate a rear area of the cargo area. Yet further included is at least one load assist strip, where a first end of the strip is mounted to the bulkhead, wherein the strip extends rearward to a second end of the strip that is mounted to the end stop.

20 Claims, 4 Drawing Sheets

U.S. PATENT DOCUMENTS

| | | |
|---|---|---|
| 5,431,525 A * | 7/1995 | Scott .............................. 414/538 |
| 5,829,945 A | 11/1998 | Stanley |
| 6,062,781 A | 5/2000 | Glaser |
| 6,213,530 B1 | 4/2001 | Bohannon |
| 6,454,149 B1 | 9/2002 | Moore |
| 6,540,124 B1 | 4/2003 | Thomas, Jr. |
| 6,974,058 B2 | 12/2005 | Stevenson |
| 7,544,027 B2 | 6/2009 | Barker |
| 2007/0034655 A1 | 2/2007 | Storer |
| 2007/0222246 A1 | 9/2007 | Harrison |
| 2008/0304947 A1 * | 12/2008 | Stout et al. ................. 414/525.1 |
| 2009/0001750 A1 | 1/2009 | Horton |

* cited by examiner

US 8,348,587 B2

VEHICLE STORAGE/LOADING SYSTEM FOR SHEETS

FIELD OF THE INVENTION

The present invention concerns a loading system for sheets of material, and more particularly relates to loading sheets of material into a vehicle, such as a van.

BACKGROUND OF THE INVENTION

Maximizing the usage of available cargo space in automotive vehicles, such as vans, is increasingly important as customers seek out smaller, more fuel efficient vehicles without wanting to compromise safety or load capability. Many van users need the ability to carry large sheet material, typically 2400 mm×1200 mm (8'×4') plywood or plasterboard, either on an occasional emergency basis or as an everyday item for small business. Currently some users try to load the sheet vertically, but the available vehicle length means that the front of the sheet then potentially restricts side vision. Furthermore, the user also has to clear the floor area to make space to allow loading in such a manner. Sliding sheet material along the floor may inflict damage to the sheet material during loading. Other users will elect to have material delivered or use a larger van, with either option proving costly. Avoiding damage during transportation requires ad hoc methods to restrain the sheet in a secure position. Accordingly, an apparatus is desired having the aforementioned advantages and solving and/or making improvements on the aforementioned disadvantages.

SUMMARY OF THE INVENTION

One aspect of the present invention is to provide an assembly for loading sheet material into a vehicle. The assembly includes a cargo area having a loading opening and a bulkhead located at an opposite end of the cargo area from the loading opening. Also included is at least one load assist strip having a first end and second end, the first end being mountable to an upper region of the cargo area proximate the bulkhead and the second end being mountable to a lower region of the cargo area proximate the loading opening. Further included is at least one end stop mountable to a lower region of the cargo area between the loading opening and the second end of the load assist strip.

Yet another aspect of the present invention is to provide a motor vehicle having an assembly for loading sheet material. The vehicle includes a cargo area having a loading opening and a bulkhead located at an opposite end of the cargo area from the loading opening. Also included is a passenger compartment located at a forward region of the vehicle. Further included is at least one fixed end stop located proximate a rear area of the cargo area. Yet further included is at least one load assist strip, where a first end of the strip is mounted to the bulkhead, wherein the strip extends rearward to a second end of the strip that is mounted to the end stop.

A further aspect of the present invention is to provide a method for loading sheet material into a vehicle comprising a cargo area having a loading opening and a bulkhead located at an opposite end of the cargo area from the loading opening. The method includes providing at least one load assist strip having a first and second end, mounting the first end to an upper region of the cargo area proximate the bulkhead and the second end to a lower region of the cargo area proximate the loading opening, and mounting at least one end stop to a lower region of the cargo area between the loading opening and the location of the mounting of the second end of the load assist strip. Also included are the steps of positioning a front edge of the sheet material onto the second end of the load assist strip, pushing the sheet material along the load assist strip toward the first end of the strip, and placing a rear edge of the sheet material into the end stop, such that the sheet material is securely loaded.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
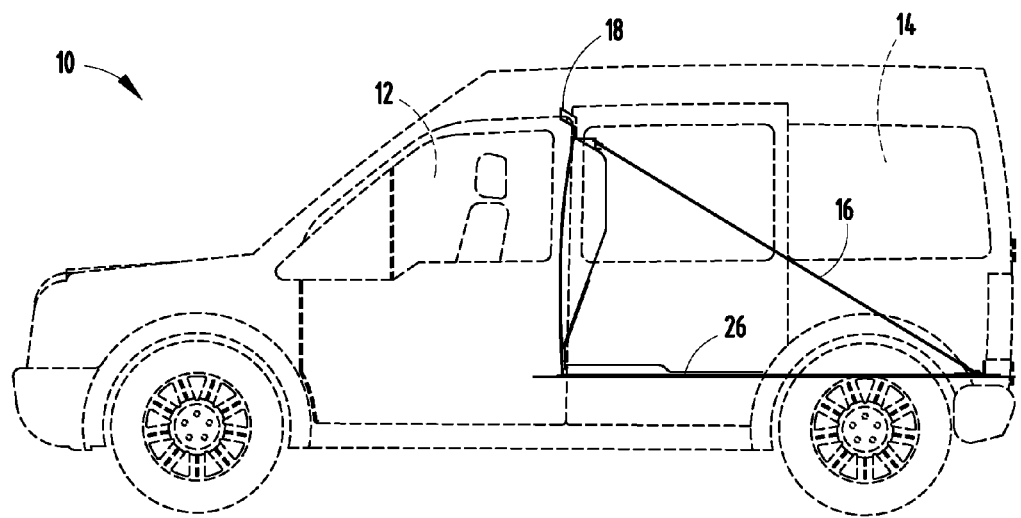
FIG. 1 is an elevated side view of a van having an assembly for loading sheet material, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 generally designates a vehicle, shown and described herein in one embodiment a van, having a sheet material loading assembly (FIG. 1). The van 10 includes a passenger compartment 12 located at a forward region of the van 10. Also included is a cargo area 14 located rearward of the passenger compartment 12, wherein the cargo area 14 is formed by a floor, a left side wall, a right side wall, a front bulkhead, a roof, and a loading opening accessible by at least one door 42. Further included is a shelf 18 located proximate a forward, upper region of the cargo area, wherein the shelf 18 extends from the top of the bulkhead forward over a portion of the passenger compartment 12. Yet further included is at least one end stop 20 located proximate a rear area of the cargo area floor, wherein the end stop 20 is mounted to the floor. The van 10 also includes at least one load assist strip 16, two in the case of the example shown in the figures, wherein a first end 22 of the strip 16 is mounted to the shelf 18 at a top of the bulkhead, wherein the strip 16 extends diagonally rearward and downward, and wherein a second end 24 of the strip 16 is mounted to the end stop 20. Although the van 10 has a shelf 18, it is conceivable that the first end 22 of the strip 16 may instead be mounted to any other part in an upper region of the bulkhead, particularly when a shelf 18 is not present.

Figure 2:
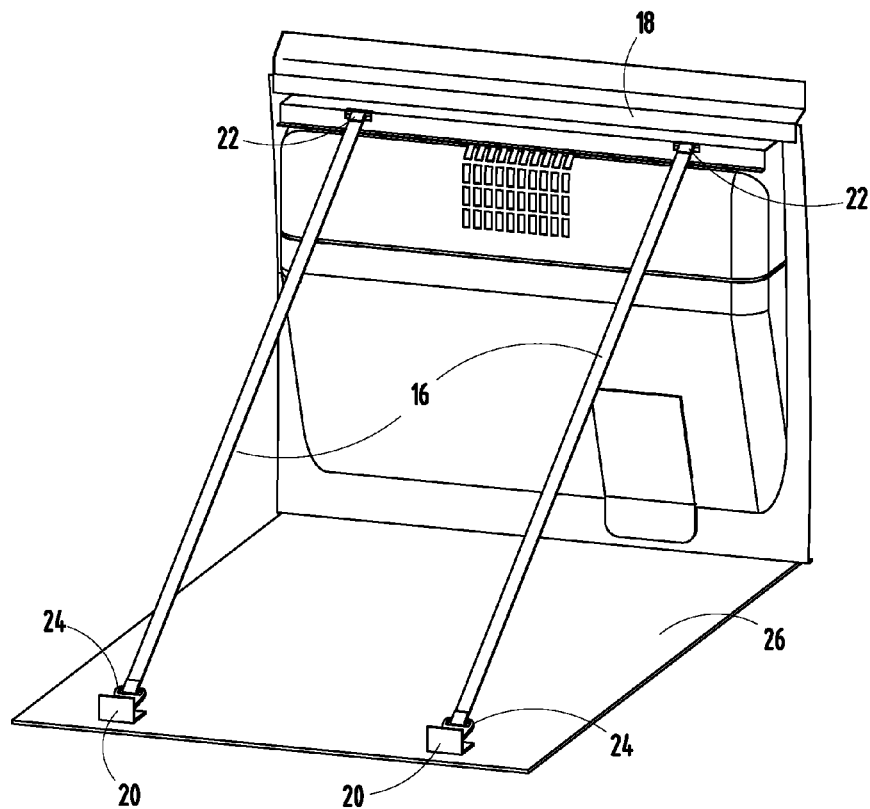
FIG. 2 is an elevated perspective view of the assembly of the van.
Figure 3:
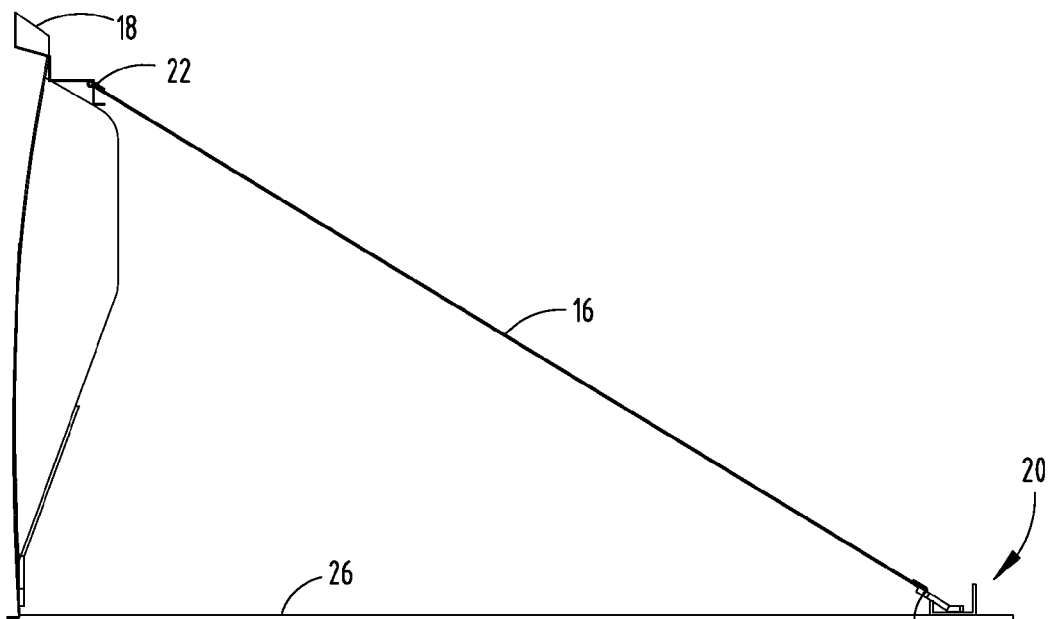
FIGS. 3 and 3A are elevated side views of alternative embodiments of the assembly.
Figure 4:
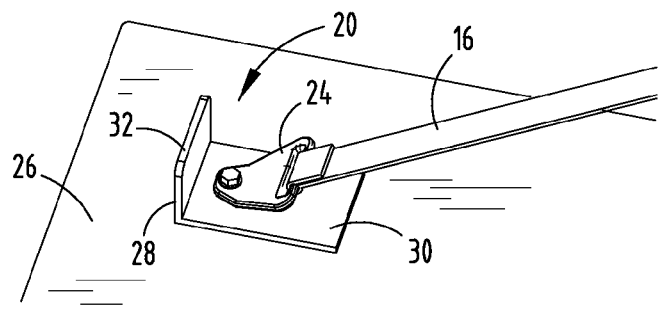
FIG. 4 is an elevated perspective view of an end stop of the assembly.

Referring to FIGS. 2-4, the cargo area 14 located in the rear of the van 10 includes two load assist strips 16 that are stretched between the shelf 18 and the end stops 20. According to one embodiment, the load assist strip 16 material may be flexible webbing, such as a seatbelt material commonly found in automobiles. Another embodiment may employ a rigid material for the load assist strip 16, such as lengths of timber. Regardless of the rigidity or flexibility of the load assist strips 16, any suitable material may be employed to act as loading guides and supports. Irrespective of the load assist strip material employed, the surface of the material typically will have a low friction surface or coating, thereby allowing a less strenuous transition of items being loaded onto the load assist strips 16.

Figure 3A:
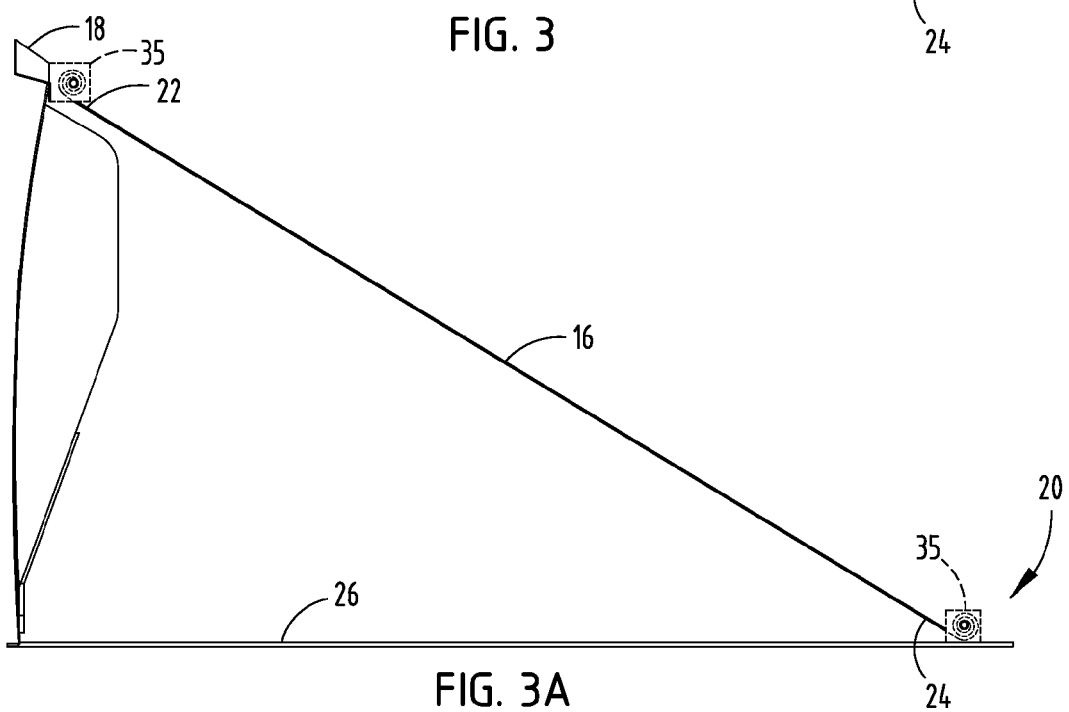

The first end 22 of the load assist strips 16 has a connection to an area located at an upper region of the bulkhead proximate the shelf 18 (FIGS. 2 and 3). A hook and loop arrangement, a seatbelt buckle mechanism, or any other suitable mechanical fastener may be employed to make the first end connection. The connection may be fixed or detachable. The second ends 24 of the load assist strips 16 have a connection to the end stops 20 located on the floor 26 of the vehicle in a lower region of the cargo area proximate the loading opening of the vehicle 10 (FIG. 4). In the illustrated embodiment, the end stops 20 include an L-shaped bracket 28 having a horizontal portion 30 that is fixed to the van floor 26 and a vertical portion 32 that provides a retaining wall to securely hold loaded sheet material 34. However, it is conceivable that other geometrically-arranged end stops 20 may be employed, such as a U-shaped bracket (FIG. 3). The second ends 24 of the load assist strips 16 may then be connected to the end stops 20 in a similar fashion as that of the first end 22 to the shelf 18. The connection may be fixed or detachable and may be accomplished by any suitable mechanical fastener. An alternative first or second end connection could also comprise a retractable reel 35 as used for seat belts to which the first end 22 or second end 24 respectively of the load assist strip 16 is fixed and onto which the flexible web material of the load assist strip 16 may be wound when not in use. As illustrated in FIG. 3A, additional embodiments of the load assist strip 16 are shown that include the first end 22 of the load assist strip 16 having the retractable reel 35 coupled with the bulkhead or alternatively, the second end connection 24 having a retractable reel 35, wherein the reel 35 could also act as the end stop 20. In either location, the retractable reel 35 could be detachable from the bulkhead or floor 26.

Figure 5:
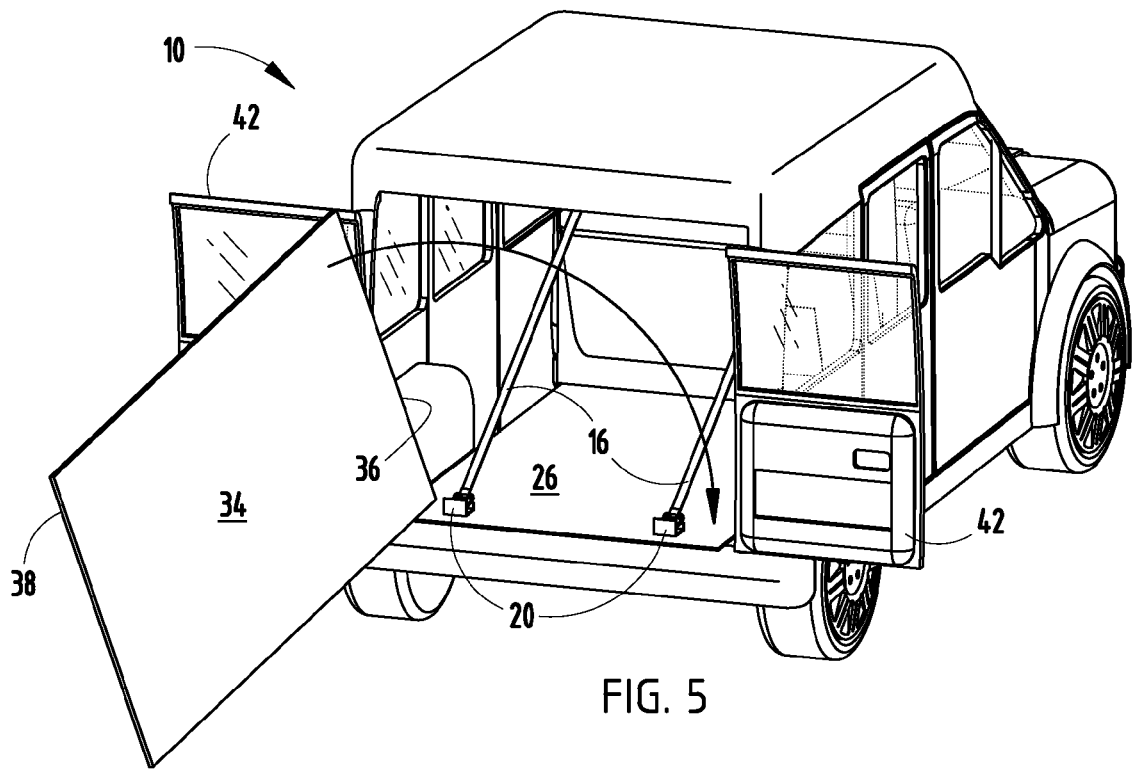
FIG. 5 is an elevated perspective view of a sheet of material just prior to loading in a cargo area of the van.
Figure 5A:
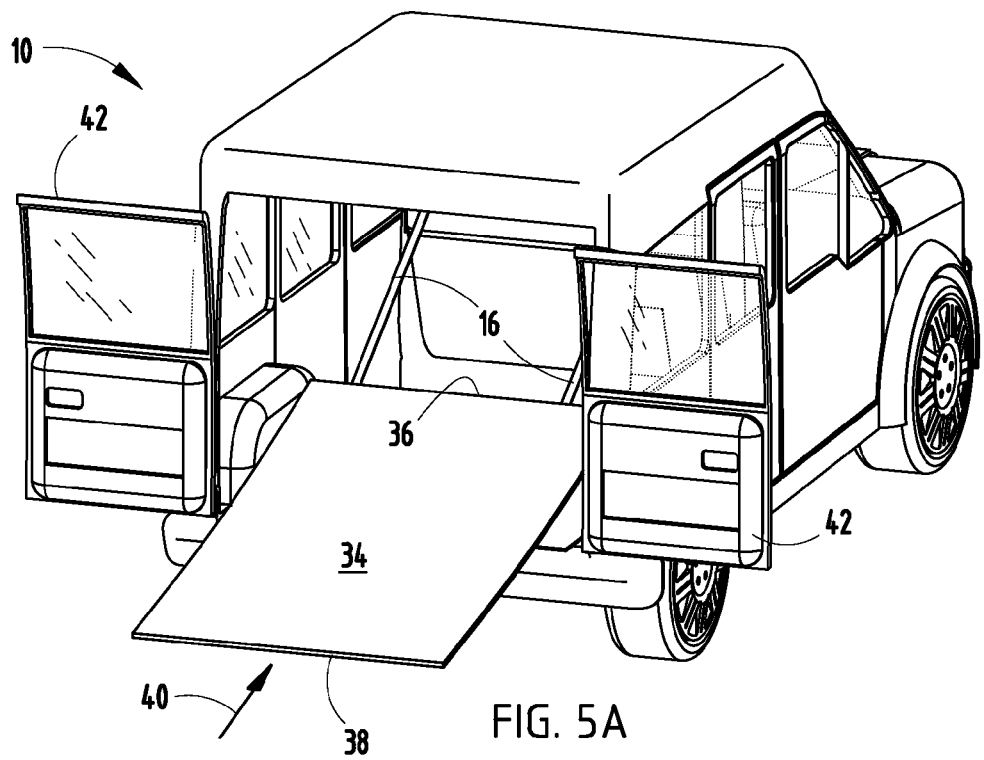
FIG. 5A is an elevated perspective view of the sheet of material with a front end of the sheet placed onto the assembly.
Figure 6:
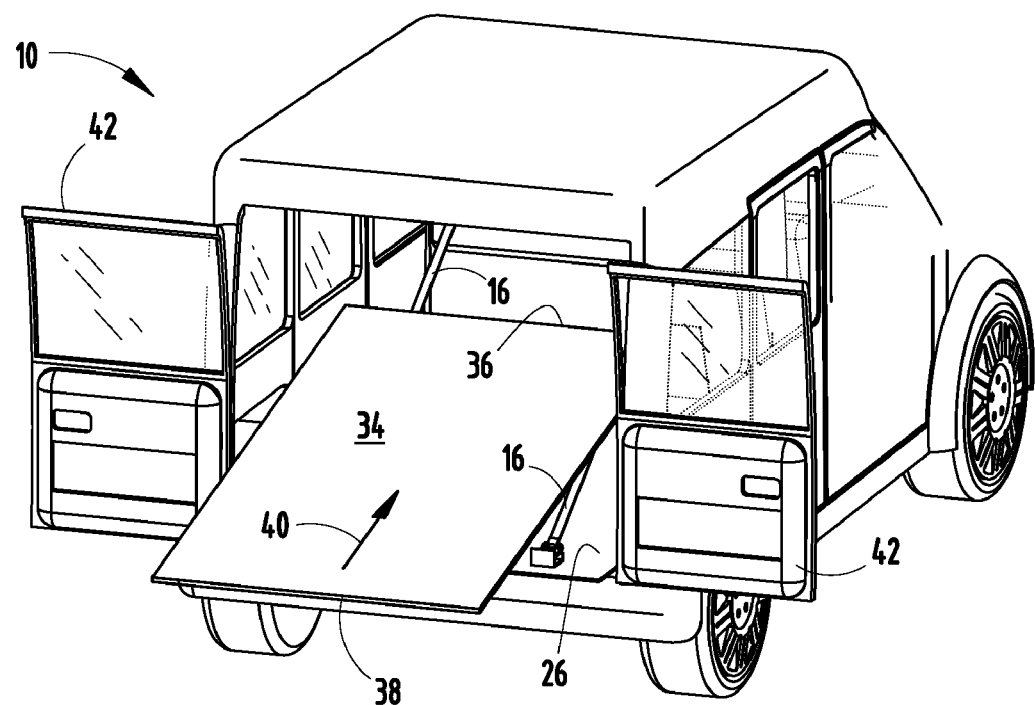
FIG. 6 is an elevated perspective view of the sheet of material being pushed forward into the cargo area via the assembly.
Figure 6A:
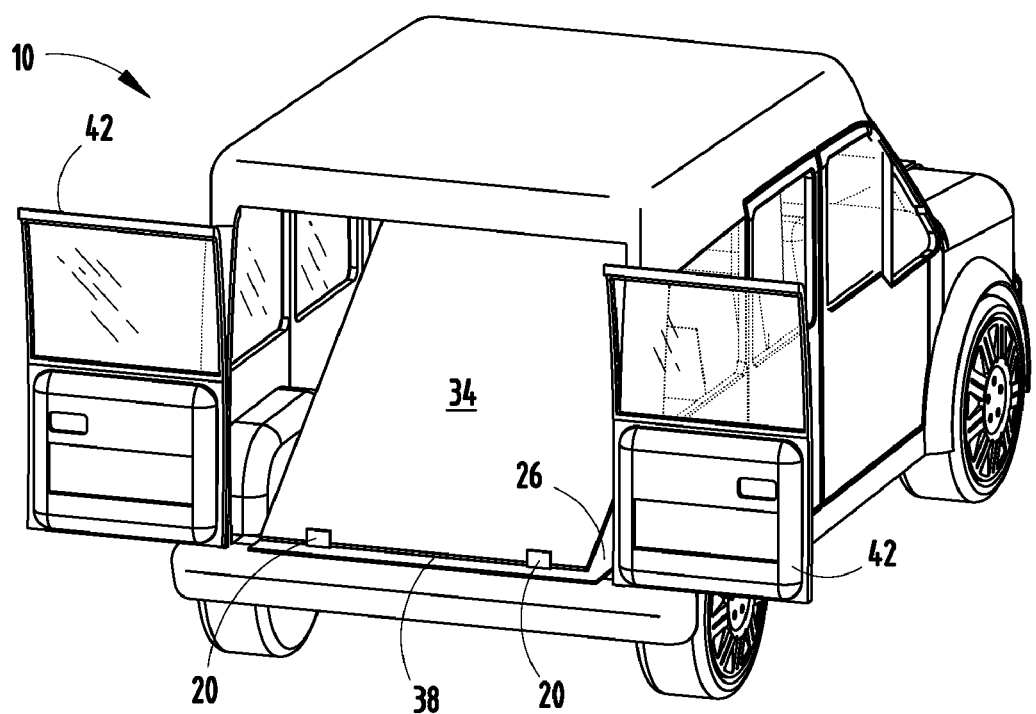
FIG. 6A is an elevated perspective view of the sheet of material fully loaded onto the assembly.

Referring to FIGS. 5-6A, a method for a user to load the sheet material 34 into the cargo area 14 of the van 10 is illustrated according to one embodiment. The user may position the sheet material 34 into an appropriate loading position by placing a front edge 36 of the sheet material 34 onto the load assist strips 16 from the rear end of the vehicle 10 with the rear doors open. After proper positioning of the sheet material 34 is accomplished, the user may simply push the sheet with sufficient force 40 in the direction of the front of the vehicle 10 to slide the sheet material 34 along the load assist strips 16. As an alternative to pushing the sheet material 34 into the van 10, a pulley system or an automated system may be employed to assist the user in the loading of the sheet material 34. After the sheet material 34 is fully loaded into the cargo area 14 of the van 10, the user places a rear edge 38 of the sheet material 34 into the end stops 20. Placing of the sheet material 34 into the end stops 20 prevents the sheet material 34 from translating rearwardly during transportation in the vehicle 10.

Advantageously, once the sheet material 34 has been loaded and lowered onto the load assist strips 16, the strips limit the amount of bending, thus avoiding damage to the sheet material 34. Additionally, the end stops 20 prevent the sheets 34 from moving rearward during transportation. Therefore, the overall assembly provides an efficient loading process, while also limiting damage to the sheet material during transportation of the vehicle.

The assembly for enabling loading of sheet material into a vehicle as described herein may either be supplied by the manufacturer as an integral part of a new vehicle or it may be retro-fitted to existing vehicles which do not already have such an assembly.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle sheet loading assembly comprising:
a cargo area of an enclosed vehicle having a floor, a rear end with a loading opening concealed with a door, and a front end with a vertically extending bulkhead located rearward a passenger compartment of the enclosed vehicle;
at least one load assist strip having a first end coupled to an upper region of the bulkhead and a second end detachably coupled to the floor proximate the loading opening; and
at least one end stop having a horizontal portion coupled to the floor and a vertical portion extending upward between the loading opening and the second end of the load assist strip for retaining an edge of sheet material supported by the load assist strip.

2. The vehicle sheet loading assembly of claim 1, wherein the load assist strip comprises a flexible web material.

3. The vehicle sheet loading assembly of claim 2, further comprising a retractable reel coupled between the upper region of the bulkhead and the first end of the load assist strip, wherein the second end of the load assist strip is configured to detach allowing the flexible web material of the load assist strip to be wound on the retractable wheel.

4. The vehicle sheet loading assembly of claim 1, wherein the end stop comprises an L-shaped bracket, and wherein the second end of the load assist strip is coupled with the L-shaped bracket.

5. The vehicle sheet loading assembly of claim 1, further comprising a retractable reel coupled between the floor and the second end of the load assist strip, wherein the end stop comprises the retractable reel.

6. The vehicle sheet loading assembly of claim 1, wherein the first end of the load assist strip is detachable coupled with the bulkhead, and wherein the load assist strip comprises a rigid material.

7. The vehicle sheet loading assembly of claim 6, wherein a surface of the load assist strip is a low friction material.

8. The vehicle sheet loading assembly of claim 1, wherein the cargo area is configured to receive an approximately eight foot long by four foot wide dimensioned sheet material, and wherein the load assist strip is configured to extend the length of the sheet material.

9. An enclosed vehicle comprising:
- a cargo area having a rear opening, a front bulkhead, and a floor extending therebetween;
- a passenger compartment located forward the front bulkhead;
- a bracket fastened to the floor proximate the rear opening having a vertical portion for retaining sheet material; and
- flexible strap extending diagonally and having a first end mounted to the bulkhead and a second end mounted to the bracket for supporting sheet material.

10. The enclosed vehicle of claim 9, wherein the bulkhead separates the cargo area from the passenger compartment, and wherein the first end of the flexible strap is coupled with an upper region of the bulkhead proximate a roof of the cargo area.

11. The enclosed vehicle of claim 9, wherein the bracket includes a horizontal portion coupled to the floor, and wherein the second end of the flexible strap is coupled to the horizontal portion of the bracket.

12. The enclosed vehicle of claim 9, wherein two flexible straps are located proximate opposite side walls of the cargo area.

13. The enclosed vehicle of claim 12, wherein the first end of each flexible strap is detachably mounted to the bulkhead and the second end of each flexible strap is detachably mounted to the floor.

14. The enclosed vehicle of claim 9, wherein the flexible strap comprises a web material.

15. The enclosed vehicle of claim 14, wherein the flexible strap includes a surface with a low friction material.

16. The enclosed vehicle of claim 14, further comprising a retractable reel to which the first end or the second end of the flexible strap is fixed and onto which the web material of the flexible strap may be wound when not in use.

17. The enclosed vehicle of claim 9, wherein the cargo area is configured to receive an approximately eight foot long by four foot wide dimensioned sheet material.

18. A sheet loading assembly comprising:
- a vehicle cargo area having a roof, a rear opening enclosed with a door, a front bulkhead rearward a passenger compartment, and a floor between the opening and bulkhead;
- a bracket coupled with the floor having a retaining wall proximate the opening for retaining a loaded sheet;
- a reel coupled with the bulkhead proximate the roof; and
- a strap extending between the bracket and the reel for loading the sheet into the cargo area.

19. The load support assembly of claim 18, wherein the strap is detachable from the bracket and retractable onto the reel.

20. The load support assembly of claim 18, wherein the strap and wall are configured to support rigid sheets.

* * * * *